Feb. 14, 1961  J. A. BENOIT  2,971,235
SAFETY PINS
Filed Oct. 4, 1957
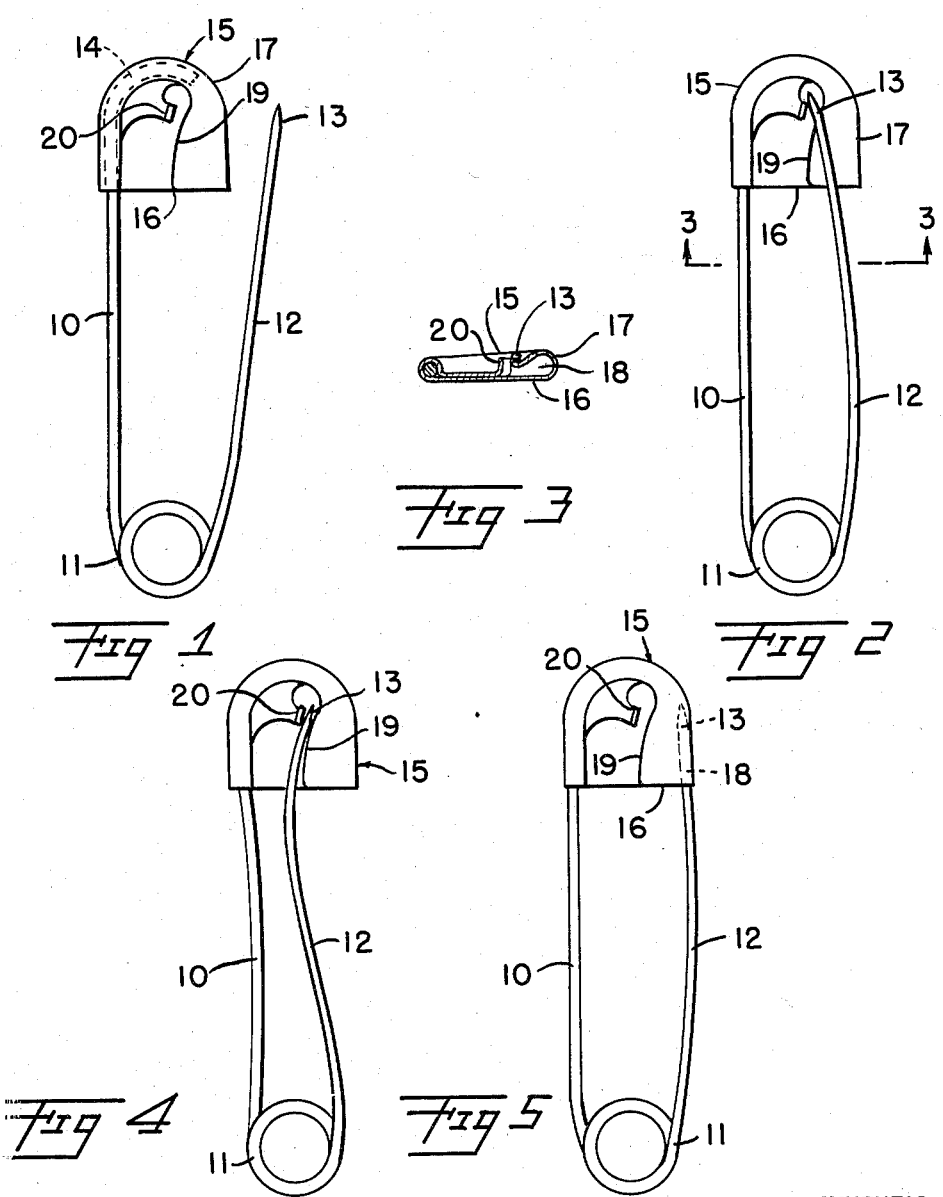
INVENTOR.
Joseph A. Benoit

United States Patent Office 2,971,235
Patented Feb. 14, 1961

2,971,235
SAFETY PINS

Joseph A. Benoit, Vivian, La.
(P.O. Box 337, Spring Hill, La.)

Filed Oct. 4, 1957, Ser. No. 688,275

2 Claims. (Cl. 24—161)

The invention pertains to new and useful improvements in safety pins and has for its principal object the provision of a pin wherein the spring arm may be readily inserted and removed from the arm guard provided the arm is moved in certain directions, but wherein accidental removal of the arm is highly improbable.

Another object of the invention is the provision of a pin guard member including a safety stop against which the pin arm must be forced to open and close the pin.

A further object of the invention is the provision of a pin which is easy to manufacture since the construction consists of only two simple pieces.

Other objects and advantages of the invention will become apparent in the course of the following detailed description when viewed together with the accompanying drawing in which:

Fig. 1 is a side elevational view of the invention showing the pin in an open position.

Fig. 2 is a view similar to that of Fig. 1, but showing the pin in the first step of closure.

Fig. 3 is a sectional view taken along lines 3—3 of Fig. 2.

Fig. 4 is another view similar to Fig. 1, but showing the pin in a second step of closure.

Fig. 5 is an elevational view showing the pin in its final position of closure.

In the drawing numeral 10 designates the stationary leg of the safety pin. The leg is extended downwardly and bent upon itself in the manner shown to form a torsion spring loop 11, the outer leg 12 of which constitutes simply an extension of the loop 11 and has the upper end 13 thereof pointed as shown.

The upper end 14 of the stationary leg 10 is bent as shown and anchored to a portion of the pin head, or guard, designated generally by the numeral 15. This head construction is similar to that of the conventional safety pin but is provided with a single flat apron portion 16 along one side. The apron portion is bent upon itself as at 17 to form a pocket 18 which encloses the spring arm 12 when the pin is closed. The side edge 19 of the apron is curved in the manner shown and for a purpose which will be subsequently described.

The head 15 is further provided with a stop member 20 formed by upsetting an extending portion of the head member as illustrated in the drawing. The stop member 20 is positioned substantially parallel to the side edge 19 of the apron loop 17 and at a distance therefrom substantially equal to the diameter of the upper end 13 of the spring arm 12.

Fig. 2 illustrates the first step in closing the pin. This figure illustrates the pin after a pressure has been applied to the outer spring arm 12 against the thrust of the torsional spring loop 11; forcing the upper end 13 of the spring arm over the apron loop 17 and against the stop member 20.

The second step in closing the pin is illustrated in Fig. 4. In this figure, the outer spring arm 12 is shown as having had an additional pressure applied to it. This time, however, the stop member 20 serves as a pivotal point, causing the spring arm 12 to assume the position shown, with the upper end 13 thereof placed in latching alignment in the opening between the stop member 20 and the edge 19 of the apron 17. When in this position, a lateral thrust of the spring arm 12 will force the end 13 into the groove 18 where it springs into the locked position as illustrated in Fig. 5.

To open the pin, a force is applied against the outer spring arm 12 sufficient to force the upper end 13 thereof against the stop member 20. Then a two-directional force is necessary—one to bend the upper end of the spring arm 13 around the pivotal stop member 20 to make it align with the exit slot and the other force at right angles to the first in order to eject the arm end from the slot and thus open the pin.

From the construction shown and described, it can be seen that it is highly improbable that the pin would open by accident or that it could be opened by a small child. It will be also noted that there are only two pieces to the construction, both of which lend themselves readily to mass production without the need of special tools or machinery. The height of the stop member 20 is well below the mean height of the pin head 15 so there will be no rough or sharp edges to the general configuration.

It will be understood that many slight changes could be made in the construction without departing from the spirit and scope of the invention as defined by the following claims.

What is claimed is:

1. A safety pin comprising, a body portion of spring wire, said body portion constituting a stationary arm and a relatively movable arm, said stationary arm provided with a guard at one end with the other arm being relatively free, said guard including a receiving slot and a socket portion for receiving and retaining the free end of said movable arm when the same is in a closed position, a stop member on said guard, said stop member being spaced inwardly from said receiving slot and projecting laterally from the plane of said guard and in the path of travel of said movable arm, said stop member serving as a fulcrum point around which the free end of said movable arm must be further bent in its path of travel to align the same with said receiving slot.

2. A safety pin comprising, a body portion of a length of spring wire bent upon itself to form a torsional loop with extending leg portions, one of said leg portions being substantially stationary and the other being relatively movable, a guard member affixed at one end to the free end of said stationary leg and having a free end, said guard forming an open-ended loop for locking said movable leg in a finally closed position, a stop member on said guard positioned in the path of travel of the free end of said movable leg member, the free end of said guard terminating in an inwardly curved configuration spaced from and opposite said stop member to define a receiving slot for the free end of said movable leg member, said stop member being spaced inwardly from the curved edge of said guard and projecting laterally from the plane thereof, said stop member lying in the path of travel of the free end of said movable leg member and serving as a fulcrum point around which said movable leg member must be bent to force the same around the inwardly curved free edge of said guard and into said receiving slot.

References Cited in the file of this patent

UNITED STATES PATENTS

| 984,409 | Wright | Feb. 14, 1911 |
| 1,019,578 | Wright | Mar. 5, 1912 |
| 1,325,093 | Henshaw | Dec. 16, 1919 |
| 1,963,446 | Peters | June 19, 1934 |

FOREIGN PATENTS

| 31,821 | Austria | Feb. 10, 1908 |